United States Patent
Yamauchi et al.

[11] Patent Number: 5,152,256
[45] Date of Patent: Oct. 6, 1992

[54] AIR-LIQUID COOLED ENGINE

[75] Inventors: Yoshinori Yamauchi; Yoshiyuki Yamamoto, Iwata; Tomoo Taira, all of Iwata, Japan

[73] Assignee: Yamaha Hatsudoki Kabushiki Kaisha, Iwata, Japan

[21] Appl. No.: 458,983

[22] Filed: Dec. 29, 1989

[30] Foreign Application Priority Data

Dec. 30, 1988 [JP] Japan .................. 63-335011

[51] Int. Cl.$^5$ ............................................. F01P 9/04
[52] U.S. Cl. ................................ 123/41.57; 123/41.7
[58] Field of Search .............. 123/41.57, 41.65, 41.69, 123/41.7, 198 C, 41.49

[56] References Cited

U.S. PATENT DOCUMENTS

| 1,075,351 | 10/1913 | Hockney | 123/41.49 |
| 1,429,159 | 9/1922 | Nelson | 123/41.57 |
| 1,486,123 | 3/1924 | Boley et al. | 123/41.49 |
| 4,662,320 | 5/1987 | Moriya | 123/198 C |

FOREIGN PATENT DOCUMENTS

| 62-116373 | 5/1987 | Japan . |
| 62-128890 | 6/1987 | Japan . |
| 62045993 | 12/1987 | Japan . |
| 70786 | 4/1952 | Netherlands | 123/41.7 |

Primary Examiner—Noah P. Kamen
Attorney, Agent, or Firm—Ernest A. Beutler

[57] ABSTRACT

Several embodiments of air-liquid cooled internal combustion engines for powering vehicles such as motor scooters. In each embodiment, the engine is provided with a finned cylinder for air cooling and a cylinder head having a liquid cooling jacket for water cooling. A radiator is provided for exchanging heat from the cylinder head cooling jacket and the atmosphere and a single fan circulates cooling air across both the radiator and the cylinder. In all embodiments, the flow across the fan, radiator and cylinder is in a series flow fashion. In many of the embodiments, the components are axially aligned. The fan is driven by the crankshaft either directly, through a gear train or through a flexible transmitter and in one case this flexible transmitter also drives the camshaft. A water pump is driven off of the camshaft for the liquid cooling system.

16 Claims, 7 Drawing Sheets

AIR-LIQUID COOLED ENGINE

BACKGROUND OF THE INVENTION

This invention relates to an air-liquid cooled engine and more particularly to an improved cooling system for an engine utilized to power a vehicle.

Internal combustion engines are, as is widely known, employed for propelling a wide variety and type of vehicles. One such type of vehicle powered by an internal combustion engine is a small motor scooter. Such motor scooters usually employ a body surround for providing a neat shape to the scooter and for protection of its mechanical components. Of course, when the engine is provided within such a body, it is necessary to employ a cooling system for cooling the engine.

Normally, such cooling systems require the use of a fan due to the enclosed configuration of the body. In order to provide more efficient cooling and to insure adequate cooling, it has been a practice to employ liquid cooled internal combustion engines in this application wherein a cooling fan is supplied for circulating air across the radiator which conveys and discharges the heat from the engine. However, this type of cooling system has some disadvantages.

Specifically, if the entire engine is liquid cooled, this is not always desirable. The reason for this is that it is preferred to operate the cylinder barrel at a higher temperature than the cylinder head in which the intake manifold or at least a portion of the intake manifold passages are formed. The reason for this is that it is desirable not to heat significantly the induction charge because this reduces the volumetric efficiency of the engine. On the other hand, if the cylinder barrel is cooled too greatly, then frictional losses become high.

It is, therefore, a principal object of this invention to provide an improved air-liquid cooled engine which can be utilized for a wide variety of applications including powering of motor vehicles.

It is a further object of this invention to provide a cooling system for an internal combustion engine wherein the cylinder may be operated at a higher temperature than the cylinder head.

Although cooling systems have been proposed that include air cooled cylinder barrels and water cooled cylinder heads, such systems are not particularly compact and can become quite complicated. It is, therefore, another object of this invention to provide an improved and simplified arrangement for an airliquid cooled internal combustion engine.

SUMMARY OF THE INVENTION

This invention is adapted to be embodied in an internal combustion engine having at least one cylinder defining a cylinder bore and which has cooling fins extending from the cylinder for its air cooling. A cylinder head is affixed relative to the cylinder and is formed with a liquid cooling jacket. The liquid cooling system further includes a radiator and means for circulating liquid coolant between the cylinder head cooling jackets and the radiator. Fan means are provided for circulating cooling air and shroud means define an air path for the air circulated by the fan means both across the radiator and across only the cooling fins of the cylinder and not across the cylinder head.

DETAILED DESCRIPTION OF THE PREFERRED EMBODIMENTS OF THE INVENTION

Figure 1:
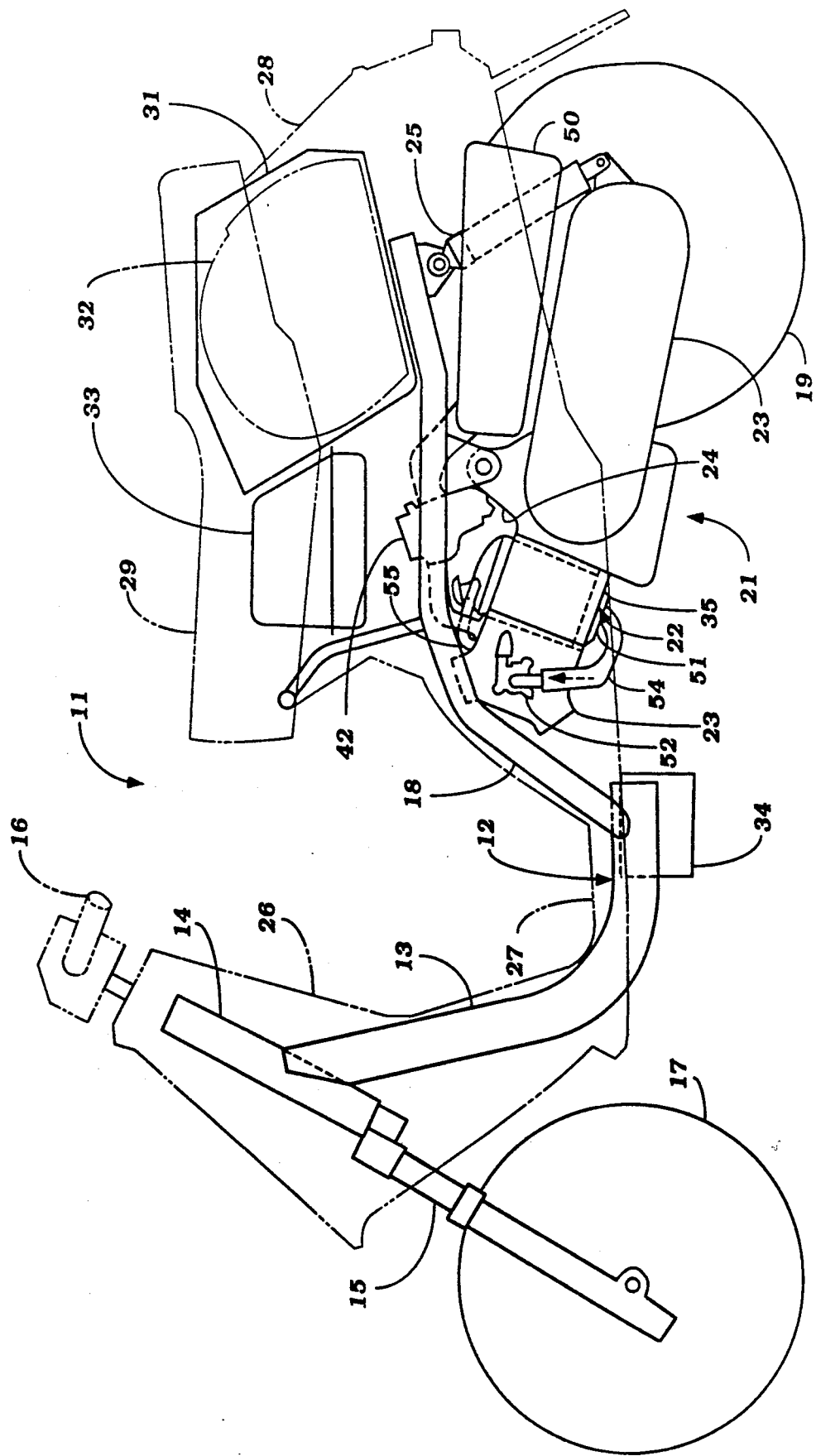
FIG. 1 is a side elevational view of a motor scooter powered by an internal combustion engine constructed in accordance with an embodiment of the invention. Portions of the motor scooter are shown in phantom to more clearly show the construction.

Referring first to FIG. 1, a small motor scooter powered by an internal combustion engine constructed in accordance with an embodiment of this invention is identified generally by the reference numeral 11. A motor scooter is depicted as a typical environment in which an engine constructed and cooled in accordance with the invention may be employed It is to be understood, however, that the invention may find applicability in other environments.

The motor scooter 11 includes a frame assembly, indicated generally by the reference numeral 12 that includes a main frame member 13 that supports a head pipe 14 which, in turn, journals a front fork assembly 15 for steering movement under the control of a handlebar assembly 16. A front wheel 17 is carried by the fork assembly 15 in a known manner.

The front tube member 13 branches into a pair of rearwardly extending tubes 18 that suspend a driven rear wheel 19 and power and transmission unit, indicated generally by the reference numeral 21. This unit 21 includes an internal combustion engine 22 and a variable speed belt drive transmission 23 which powers the rear wheel 19 in a known manner. The power and transmission unit 21 and rear wheel 19 are supported by the frame assembly 18 for pivotal movement by means of a mounting bracket 24. A combined spring and hydraulic damper assembly 25 is interposed between the transmission 23 and the rear end of the frame members 18 for the suspension travel of the rear wheel 19, as is well known in this art.

The scooter 11 is provided with a cowling or body that is comprised of a front leg shield 26, a floor board 27 and a rear or main body portion 28. The body is shown in phantom so as to more clearly reveal the construction of the engine and its cooling system.

A seat 29 is carried at the rear of the frame assembly on the frame members 18 and is designed to accommodate a rider and one or more passengers. To the rear of the seat 29 there is provided a luggage carrier 31 that has an interior storage compartment so as to hold articles such as a rider's helmet 32. A fuel tank 33 is positioned forwardly of the storage compartments 31 and beneath the seat 29. A battery 34 is carried at the lower portion of the frame tube 13 so as to provide a low center of gravity. The battery 34 provides electrical power for the lighting system of the scooter 11, its instruments and other components. The battery 34 is charged from a magneto generator of the engine 22 in a known manner.

Referring now additionally and primarily to FIGS. 2 and 3, the construction of the engine 22 and its cooling system will now be described. In the illustrated embodiment, the engine 22 is of the single cylinder, four cycle type. It is to be understood, of course, that the invention can be practiced in conjunction with engines of other cylinder configurations and other numbers of cylinders. The invention also may be utilized in conjunction with two cycle engines but it has particular utility in conjunction with four cycle engines.

The engine 22 includes a cylinder block or cylinder barrel 35 in which a pressed in cylinder liner 36 is positioned. A piston 37 reciprocates within the cylinder bore and is connected by means of a connecting rod 38 so as to drive a crankshaft 39. The crankshaft 39 is rotatably journaled in a crankcase assembly 40 that is positioned at the base of the cylinder barrel 35. It should be noted that the engine 22 is positioned in the motor scooter 11 so that the cylinder barrel 35 extends generally horizontally although it is inclined at a slight angle upwardly from the horizontal and from the axis of rotation of the crankshaft 39.

A cylinder head assembly 41 is affixed to the cylinder barrel 35 in a known manner and includes an induction system including an intake port (not shown) that receives a fuel/air charge from a carburetor 42 and air cleaner 50 (FIG. 1) in a known manner. An intake valve (not shown) is supported within the cylinder head assembly 41 and communicates the intake charge with a combustion chamber 43 formed by the cylinder head assembly 41, piston 37 and cylinder liner 36. This intake valve is operated by means of an overhead mounted camshaft 43 that is journaled in the cylinder head assembly 41 and is driven from the crankshaft by means of a chain or belt 44. This chain or belt extends across the lower portion of the cylinder barrel 35 and may extend through a recess formed therein or one which is covered by a front cover assembly. The specific manner of drive of the camshaft 43 forms no part of the invention.

The engine 22 is provided with an air-liquid cooling system. The air portion of this cooling system includes a plurality of cooling fins 45 that extend around the cylinder barrel 35 and which are contained within a cooling shroud 46 that is affixed in any suitable manner around the cylinder barrel 35. The cooling shroud 46 has a sidewardly facing inlet opening 47 and a generally downwardly facing outlet opening 48 at the opposite side. It should be noted that the cooling shroud 46, although it may be affixed in part to the cylinder head assembly 41, generally surrounds only the cylinder barrel 35 and its cooling fins 45.

The liquid portion of the cooling system for the engine includes a cylinder head cooling jacket 49 that is formed integrally within the cylinder head assembly 41 and primarily encircles the combustion chamber 43 and aforedescribed intake port. In addition, the cooling jacket 49 will encircle the exhaust part (not shown) of the engine and the exhaust valve which is also operated by the camshaft 43 in a known manner. The exhaust gases are discharged to the atmosphere from an exhaust system which is not shown and which may be considered to be conventional.

The heat extracted from the cylinder head assembly 41 by the cooling jacket 49 is exchanged to the atmospheric air by means of a radiator or heat exchanger indicated generally by the reference numeral 51. The radiator 51 is, in the illustrated embodiment, of the down flow type and is disposed with its core extending across the inlet opening 47 of the shroud 46. Liquid coolant is circulated through the cooling jacket 49 and core of the radiator or heat exchanger 51 by means of a water pump assembly, indicated generally by the reference numeral 52 and which is driven from the camshaft 43 at one side thereof. The coolant pump 52 draws coolant from the radiator 51 through a supply conduit 53. The coolant is then circulated through the cylinder head cooling jacket 49 through a supply line 54 and then is returned to the opposite header tank of the radiator 51 through a return conduit 55.

In order to circulate air both across the radiator 51 and across the cooling fins 45 of the cylinder barrel 35, there is provided, in this embodiment, an axial flow fan 56 that is contained within the inlet opening 47 of the shroud 46 and which is journaled by a bearing assembly 57 positioned adjacent one side of the cylinder barrel 35 and supported in a suitable manner from the crankcase 40. The axial flow fan 56 has a drive gear 58 formed integrally thereon which is enmeshed with a driving gear 59 that is affixed to the fly wheel magneto 61 driven by the crankshaft 39 in a direct manner. The fly wheel magneto 61 is contained within the crank case 40 and is offset from the cylinder barrel 35 as clearly shown in FIG. 2.

It should be readily apparent that the described construction is extremely compact and yet at the same time insures that the cylinder barrel 35 can operate at a different temperature than the cylinder head assembly 41. In addition, the cooling systems are substantially independent of each other even through only a single cooling fan 56 is utilized for both cooling systems.

Figure 2:
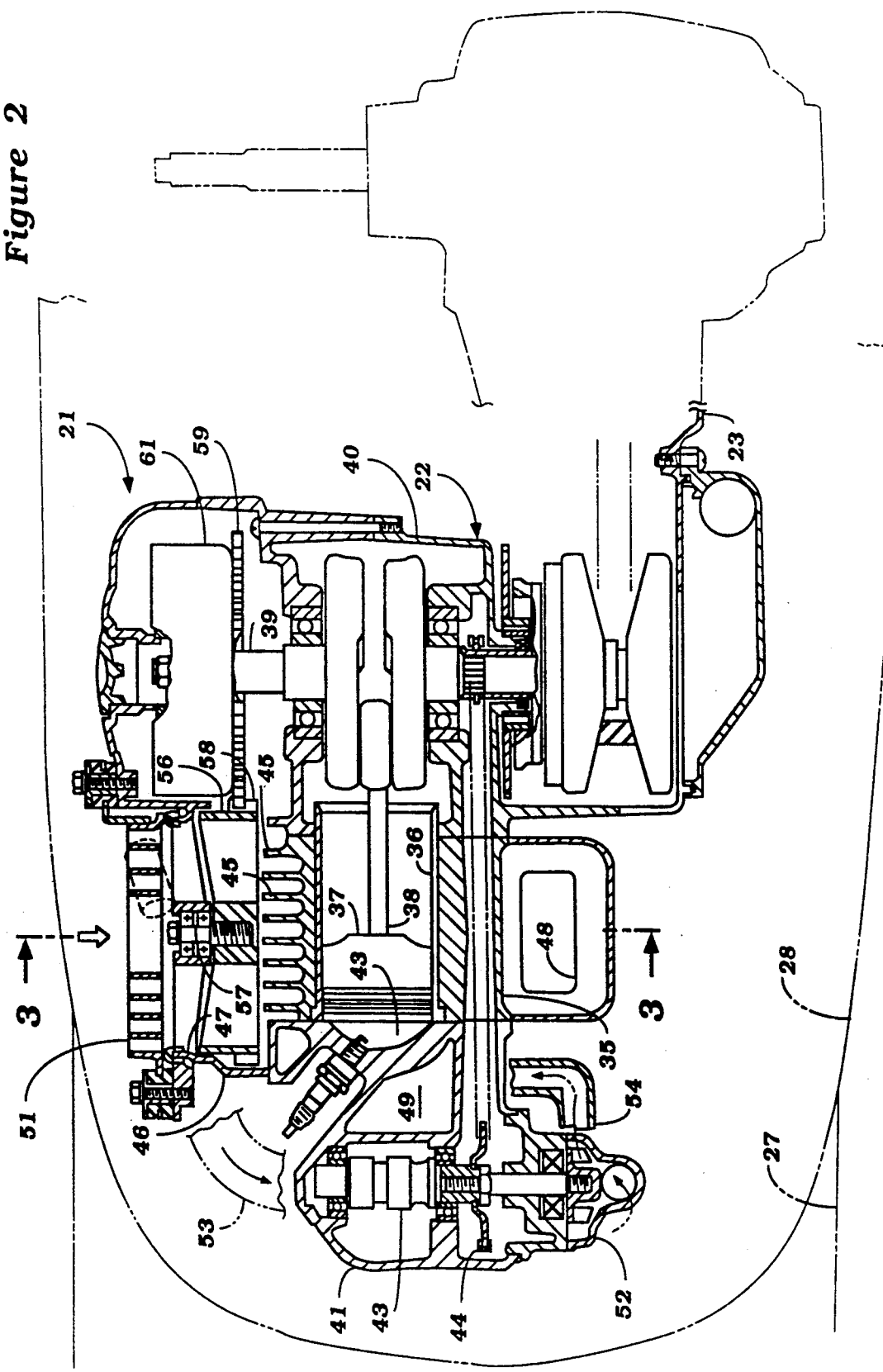
FIG. 2 is a cross sectional view taken generally along a horizontally extending plane and shows the engine and portion of the transmission of the motor scooter of this embodiment.
Figure 3:
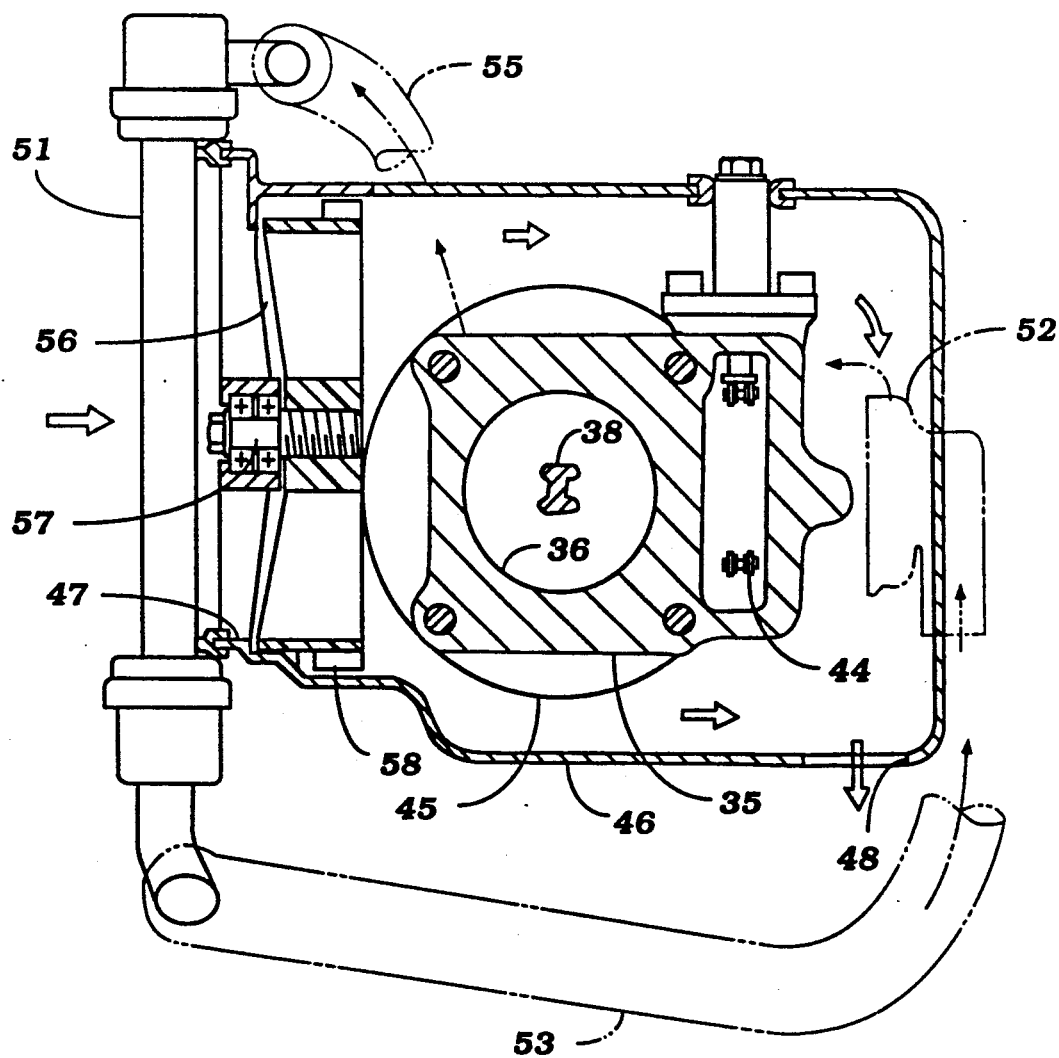
FIG. 3 is a cross sectional view taken along the line 3—3 of FIG. 2.
Figure 4:
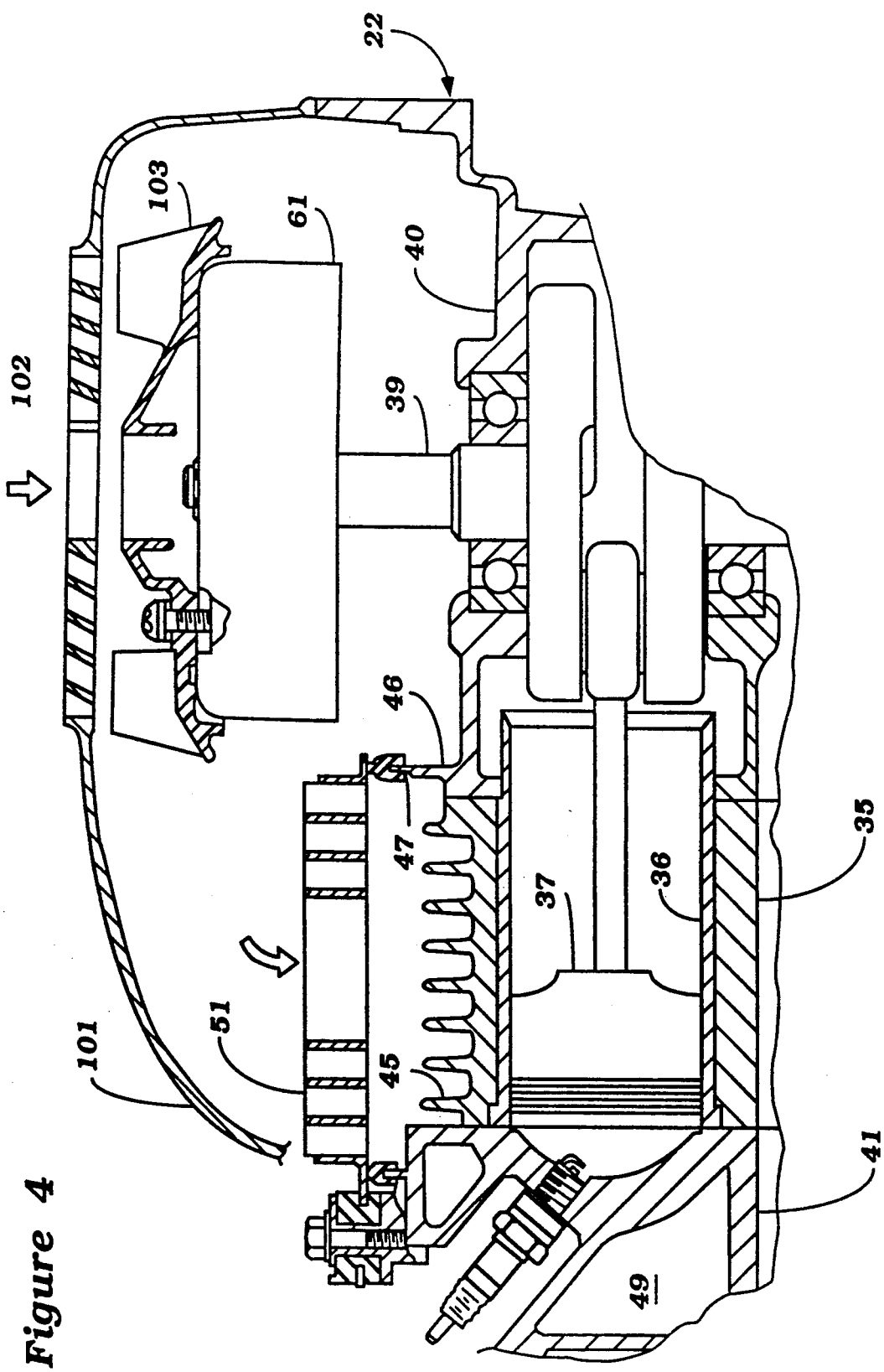
FIG. 4 is a cross sectional view, in part similar to FIG. 2, and shows a second embodiment of the invention.

In the embodiment of FIGS. 1 through 3, the fan was of the axial flow type and was disposed adjacent the cylinder barrel FIG. 4 shows another embodiment which is generally the same as the previously described embodiment and, for that reason, components of this embodiment which are the same have been identified by the same reference numerals and will be described again only insofar as is necessary to understand the construction and operation of this embodiment.

In this embodiment, the radiator 51 is positioned within a further shroud 101 that extends around the engine cylinder barrel cooling shroud 46 and the crankcase 40. This additional shroud 101 may be attached to the cylinder head assembly 41 and is formed with an inlet opening 102 that is juxtaposed to a centrifugal fan 103 that is affixed directly to the flywheel magneto assembly 61. The air circulated by the fan 103 will pass into the inlet opening 47 of the cylinder barrel cooling shroud 46 having first passed across the radiator 51 for its cooling in the manner as aforedescribed.

Figure 5:
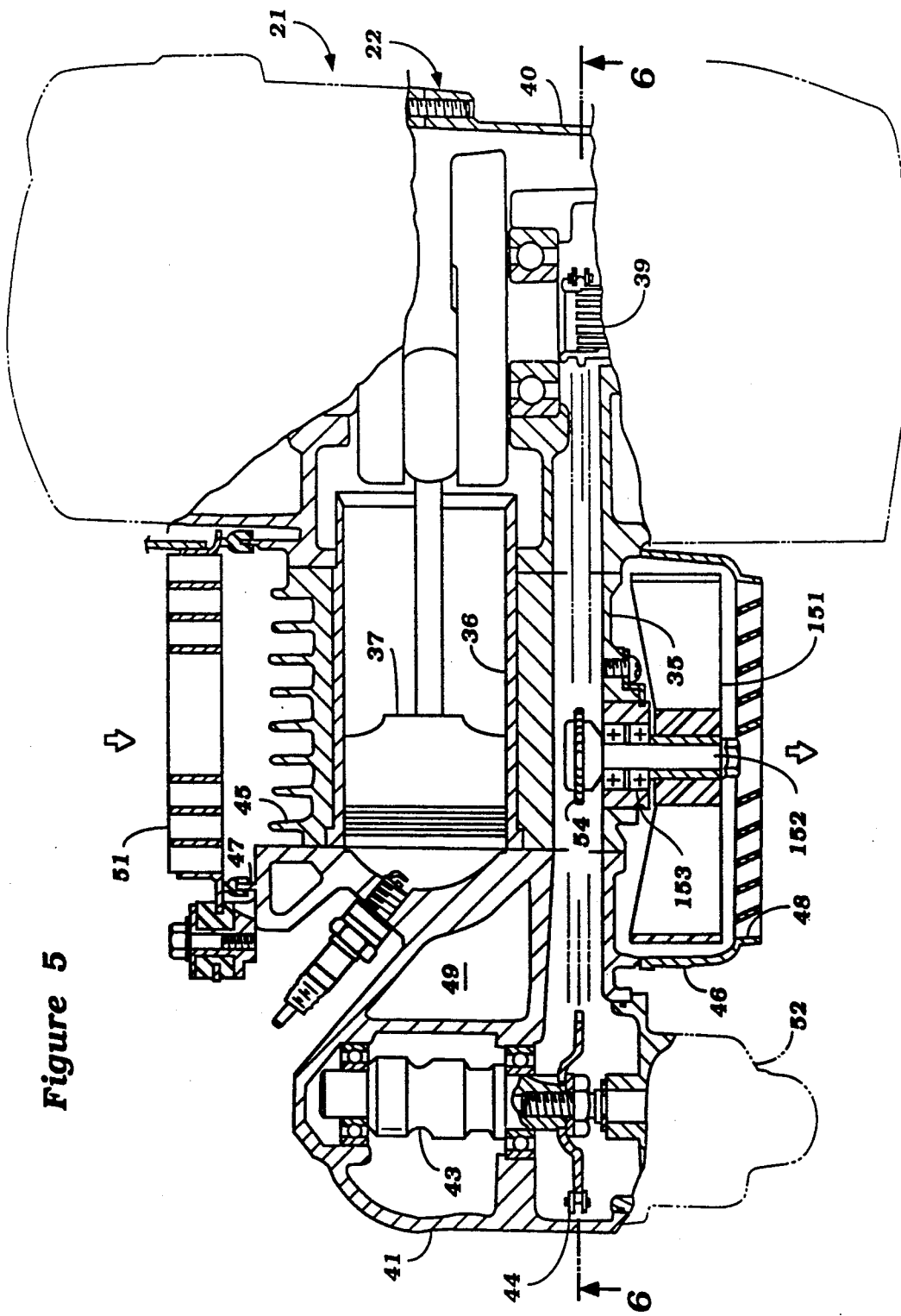
FIG. 5 is a cross sectional view, in part similar to FIGS. 2 and 4, and shows a still further embodiment of the invention.
Figure 6:
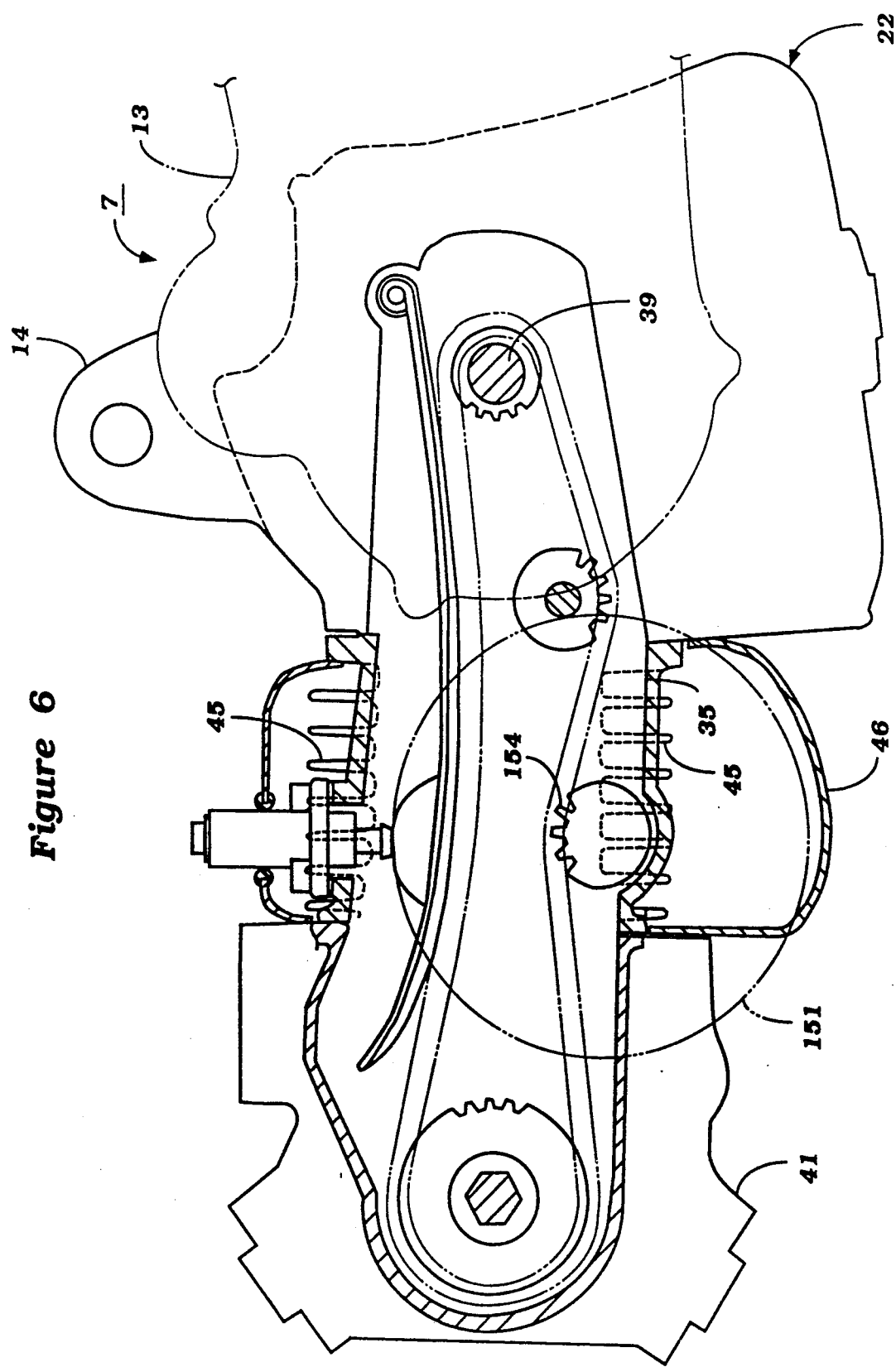
FIG. 6 is a cross sectional view taken along the line 6—6 of FIG. 5.

In the two embodiments of the invention as thus far described, the cooling fan has been positioned at the inlet side of the cooling shroud 46 for the cylinder barrel FIGS. 5 and 6 show another embodiment of the invention wherein the fan to be described, is positioned adjacent the outlet opening of the cooling shroud. That is, in the previously described embodiments, the cooling fan delivers air under pressure to the cooling system. In this embodiment, however, the fan acts more like an extraction device. The extraction of air from the cooling shroud causes fresh cooling air to enter the shroud and flow across the radiator, as will be described. This embodiment, like the previously described embodiments, uses many components which are the same as already described. In those instances these components are identified by the same reference numerals.

In this embodiment, an axial flow fan 151 is affixed to a shaft 152 which is journaled by a bearing assembly 153 on one side of the cylinder barrel 35. A sprocket 154 is affixed to the inner end of the shaft 152 and is enmeshed with the chain 49 for driving the fan 151 from the engine. As a result, the fan 151 will extract air through the cooling shroud outlet 48 and cause atmospheric air to enter the cooling shroud inlet 47 after flowing across the radiator 51.

Figure 7:
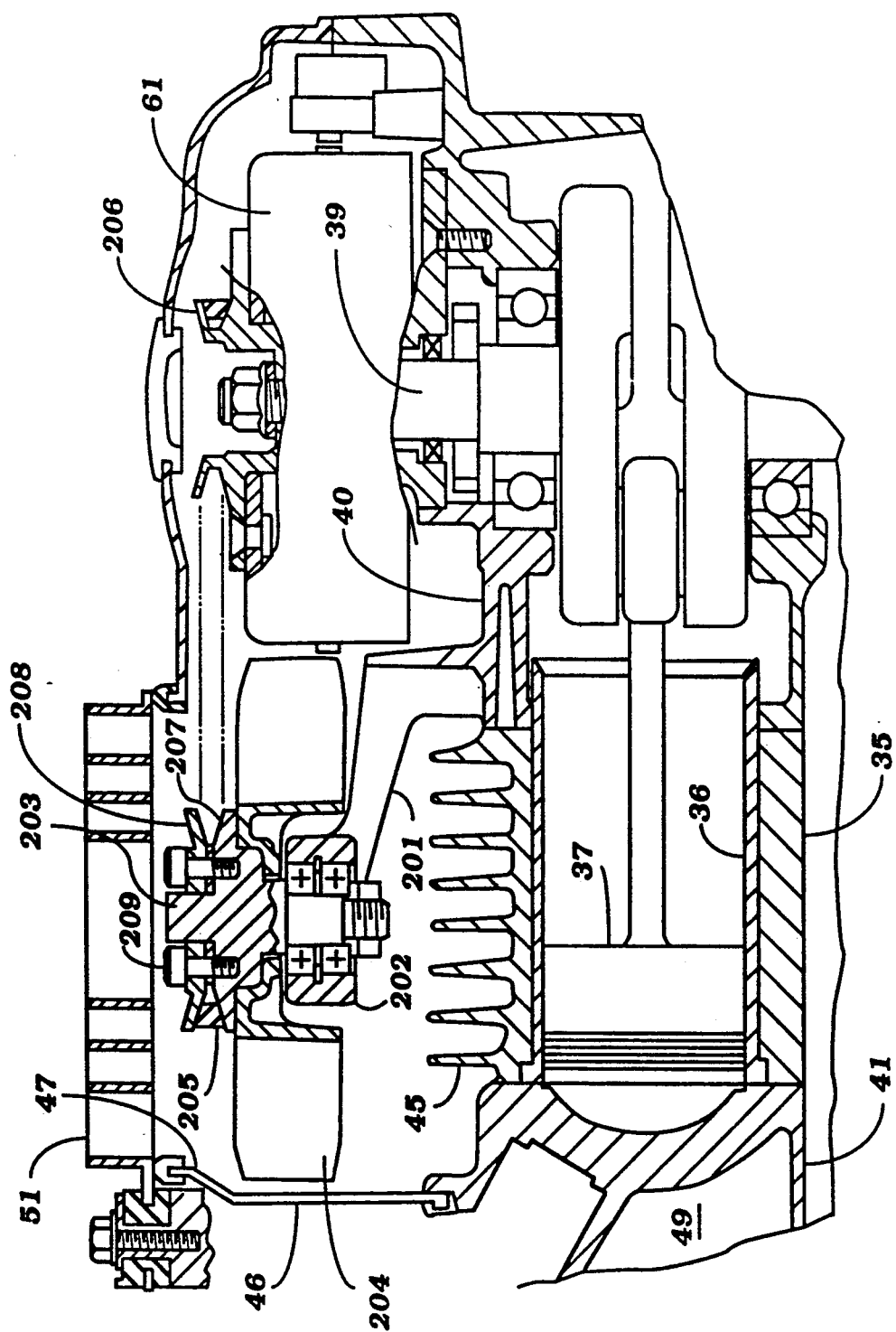
FIG. 7 is a cross sectional view, in part similar to FIGS. 2, 4 and 5, and shows yet another embodiment of the invention.

FIG. 7 shows another embodiment of the invention which is generally the same as the embodiment of FIGS. 1 through 3. Because of this similarity, components which are the same or substantially the same have been identified by the same reference numerals as applied to FIGS. 1 through 3.

In this embodiment, a fan bracket 201 is affixed to the crankcase 40 and has a bearing section 202 that is aligned with the cooling fins 45 of the cylinder barrel 35. A shaft 203 is journaled therein and has an axial flow fan 204 affixed thereto. The fan 204 is driven by a belt 205 which is, in turn, driven by a pulley 206 affixed to one side of the flywheel magneto 61. The shaft 203 has an inclined portion 207 which engages one side of the belt 205. A sheave half 208 is affixed to the shaft 203 by fasteners 209 so as to complete the driven pulley.

It should be readily apparent that a number of embodiments of the invention have been illustrated and described, each of which provides a very compact yet effective system for air and water cooling of the engine In each embodiment, a single fan is employed for driving air across the radiator of the engine and also across the finned cylinder barrel. Various relationships between the fan, cooling shroud inlet, cooling shroud outlet and radiator have been disclosed. In addition to the those variations illustrated, various other relationships can be provided without departing from the spirit and scope of the invention, as defined by the appended claims.

We claim:

1. An internal combustion engine having at least one cylinder defining a cylinder bore, cooling fins extending from said cylinder for cooling thereof, a cylinder head affixed relative to said cylinder, a liquid cooling jacket formed in said cylinder head, a radiator, means for circulating liquid coolant between said cylinder head cooling jacket and said radiator, fan means for circulating cooling air, and shroud means for defining an air path for air circulation by said fan means across said radiator and across the cooling fins of said cylinder, wherein the cylinder extends from a crankcase assembly and wherein the cylinder is offset to one side of the crankcase assembly and the cooing fan and radiator are disposed adjacent the cylinder to the offset area adjacent the crankcase assembly.

2. An internal combustion engine as set forth in claim 1 wherein the fan comprises an axial flow fan.

3. An internal combustion engine as set forth in claim 2 wherein the fan is driven by a crankshaft of the engine rotatably journaled in the crankcase.

4. An internal combustion engine as set forth in claim 3 wherein the fan is driven from the crankshaft by a gear train.

5. An internal combustion engine as set forth in claim 3 wherein the fan is driven from the crankshaft by a flexible transmitter.

6. An internal combustion engine having at least one cylinder defining a cylinder bore, cooling fins extending from said cylinder for cooling thereof, a cylinder head with a spark plug affixed relative to said cylinder, a liquid cooling jacket formed in said cylinder head, a radiator, means for circulating liquid coolant between said cylinder head cooling jacket and said radiator, fan means for circulating cooling air, and shroud means for defining an air path for air circulation by said fan means across said radiator and across the cooling fins of said cylinder, wherein the shroud means does not cover at least that portion of the cylinder head with the spark plug so that air is not circulated past the portion.

7. An internal combustion engine as set forth in claim 6 wherein the means for circulating liquid coolant comprises a pump driven by the engine and positioned externally of the shroud means.

8. An internal combustion engine as set forth in claim 7 in combination with a vehicle powered by the engine and wherein the engine radiator, fan means and shroud means are pivotally supported relative to the vehicle as a unit.

9. A vehicle having an internal combustion engine having at least one cylinder defining a cylinder bore, cooling fins extending from said cylinder for cooling thereof, a cylinder head affixed relative to said cylinder, a liquid cooling jacket formed in said cylinder head, a radiator, means for circulating liquid coolant between said cylinder head cooling jacket and said radiator, fan means for circulating cooling air, and shroud means for defining an air path for air circulation by said fan means across said radiator and across the cooling fins of said cylinder, wherein the radiator, fan means, and shroud means are pivotally supported relative to the vehicle as a unit.

10. An internal combustion engine as set forth in claim 9 wherein the means for circulating liquid coolant comprises a pump driven by the engine and positioned externally of the shroud means.

11. An internal combustion engine as set forth in claim 10 further including a camshaft with drive means for operating valves of the engine and drive means for driving the vehicle at one side of the engine, said camshaft drive means being positioned at the same side of the engine as the means for driving the vehicle.

12. An internal combustion engine as set forth in claim 11 wherein the fan means is disposed on the opposite side of the engine from the camshaft drive and the means for driving the vehicle.

13. The internal combustion engine as set forth in claim 12 wherein the fan means is driven from the engine output shaft at the opposite side of the engine.

14. An internal combustion engine having at least one cylinder defining a cylinder bore, cooling fins extending from said cylinder for cooling thereof, a cylinder head affixed relative to said cylinder, a liquid cooling jacket formed in said cylinder head, a radiator, pump means for circulating liquid coolant between said cylinder head cooling jacket and said radiator, fan means for circulating cooling air, shroud means for defining an air path for air circulation by said fan means across said radiator and across the cooling fins of said cylinder, and an output shaft driving a camshaft for operating the valves of the engine and the pump means, wherein the pump means is located externally of the shroud means.

15. An internal combustion engine having at least one cylinder defining a cylinder bore, cooling fins extending from said cylinder for cooling thereof, a cylinder head with a spark plug affixed relative to said cylinder, a liquid cooling jacket formed in said cylinder head, a radiator, means for circulating liquid coolant between said cylinder head cooling jacket and said radiator, fan means for circulating cooling air, and shroud means for defining an air path for air circulation by said fan means across said radiator and across the cooling fins of said cylinder, wherein said spark plug is disposed externally of the shroud means for servicing.

16. An internal combustion hinge having at least one cylinder defining a cylinder bore, cooling fins extending from said cylinder for cooling thereof, a cylinder head affixed relative to said cylinder, a liquid cooling jacket formed in said cylinder head, a radiator, pump means driven by said engine for circulating liquid coolant between said cylinder head cooling jacket and said radiator, fan means for circulating cooling air, and shroud means for defining an air path for air circulation by said fan means across said radiator and across the cooling fins of said cylinder, wherein said pump means is located externally of the shroud means.

* * * * *

UNITED STATES PATENT AND TRADEMARK OFFICE
CERTIFICATE OF CORRECTION

PATENT NO. : 5,152,256

DATED : October 6, 1992

INVENTOR(S) : Yamauchi, et. al.

It is certified that error appears in the above-identified patent and that said Letters Patent is hereby corrected as shown below:

Column 5, line 62, Claim 1, "to" should read --in--.

Column 6, line 56, Claim 13, "The" should be --An--.

Column 8, line 3, Claim 16, "hinge" should be --engine--.

Signed and Sealed this

Thirtieth Day of November, 1993

Attest:

BRUCE LEHMAN

Attesting Officer

Commissioner of Patents and Trademarks